United States Patent Office

3,420,655
Patented Jan. 7, 1969

3,420,655
AMINE-PHOSPHORUS PENTAFLUORIDE COMPLEXES AS HERBICIDES
Mervin E. Brokke, Richmond, Calif., George E. Lukes, deceased, late of El Cerrito, Calif., by John Hazzard, administrator, Kentfield, Calif., and Duane R. Arneklev, Sunnyville, Calif., assignors to Stauffer Chemical Company, New York, N.Y., a corporation of Delaware
No Drawing. Filed Apr. 20, 1965, Ser. No. 450,261
U.S. Cl. 71—86    6 Claims
Int. Cl. A01n 5/00; C07c 87/00

ABSTRACT OF THE DISCLOSURE

This invention pertains to combating weeds by applying to the weed habitat a phytotoxic amount of a complex addition product of phosphorus pentafluoride and an amine corresponding to the formula

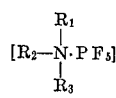

in which $R_1$, $R_2$ and $R_3$ are hydrogen, lower alkyl, cycloalkyl, phenyl, naphthyl or substituted phenyl in which the substituents are halogen, nitro, lower alkoxy or lower alkyl. Representative compounds are p-chloroaniline-phosphorus pentafluoride complex, 2,5-dichloroaniline-phosphorus pentafluoride complex, 2,4-dichloroaniline-phosphorus pentafluoride complex, N-methyl-o-toluidine-phosphorus pentafluoride complex, 1-aminonaphthalene-phosphorus pentafluoride complex.

---

This invention relates to certain organic compounds which may be used as herbicides. More particularly, this invention pertains to complex addition products of phosphorus pentafluoride and amines as represented by the following formula:

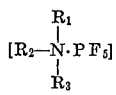

wherein $R_1$, $R_2$ and $R_3$ are selected from the group consisting of hydrogen, lower alkyl, cycloalkyl, phenyl, naphthyl and substituted phenyl wherein said substituents are selected from the group consisting of halogen, nitro, lower alkoxy and lower alkyl.

It has been found that the compounds of the present invention are particularly effective as herbicides. They are effective in the control of grasses and broadleaf plants, exhibiting both pre-emergence and post-emergence activity.

The compounds of the present invention can be prepared by various methods. One such method is by contacting the appropriate amine under anhydrous conditions with gaseous phosphorus pentafluoride in a cooled normally inert liquid organic solvent, such as benzene, toluene, and the like. The products can be obtained in very high yields and technical purity.

Although the exact nature of the phosphorus pentafluorideamine adducts of the present invention have not as yet been fully determined, the evidence gathered thus far indicates them to be a type of addition product, since their formation is not accompanied by the elimination or formation of any detectable by-products. In lieu of more substantial evidence as to the exact nature of the instant compounds any further discussion along theoretical lines of possible structure will be foregone. It should be pointed out, however, that the formulation of the compounds of the present invention are not promiscuous, but instead are discrete compositions.

The method of preparing typical compounds of the present invention, as well as the manner of using them in herbicidal compositions, are illustrated in the following examples.

EXAMPLE 1

P-chloroaniline (40 g.) was dissolved in 200 ml. of benzene. The solution was cooled with an ice bath and saturated with phosphorus pentafluoride gas. The product was collected and washed with benzene. There was obtained 52.5 g. of the corresponding complex, M.P. 207–210° C.

*Analysis.*—Calculated for $C_6H_6ClF_5NP$: nitrogen, 5.52%. Found: nitrogen, 5.64%.

EXAMPLE 2

Isoamylamine (20 ml.) was dissolved in benzene (100 ml.). The resulting solution was cooled with an ice bath and saturated with phosphorus pentafluoride gas. The product was collected and determined to be the corresponding 1:1 adduct, M.P. 115–118° C.

The following is a table of the complexes prepared according to the aforedescribed procedures. Compound numbers have been assigned to each compound and are used throughout the balance of the application.

TABLE I

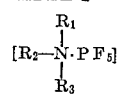

| Compound No. | $R_1$ | $R_2$ | $R_3$ |
|---|---|---|---|
| 1* | H | H | 4-chlorophenyl. |
| 2 | H | H | 2-nitro-4-chlorophenyl. |
| 3 | H | H | 2,5-dichlorophenyl. |
| 4 | H | H | 3,4-dichlorophenyl. |
| 5 | H | H | 4-methoxyphenyl. |
| 6 | H | H | 2,4-dichlorophenyl. |
| 7 | $CH_3$ | $CH_3$ | Phenyl. |
| 8 | H | $CH_3$ | 2-methylphenyl. |
| 9 | $C_2H_5$ | $C_2H_5$ | Ethyl. |
| 10 | H | $C_2H_5$ | Cyclohexyl. |
| 11 | H | $i-C_3H_7$ | i-propyl. |
| 12* | H | H | i-amyl. |
| 13 | H | H | 1-naphthyl. |
| 14 | H | Phenyl | Phenyl. |
| 15 | H | H | Hydrogen. |

*No. 1 prepared in Example 1, No. 12 prepared in Example 2.

As previously mentioned, the herein described novel compositions produced in the abovedescribed manner are phytotoxic compounds which are useful and valuable in controlling various plant species. The compounds of this invention were tested as herbicides in the following manner.

Pre-emergence herbicide test.—The seeds of crab grass, foxtail, wild oats, red oats, watergrass, pigweed, Indian mustard and annual bluegrass were planted in individual rows one-half inch deep in Santa Cruz sandy loam soil contained in compressed paper flats 8¼" x 6½" which are 2¾" deep. Enough seeds were planted to give about thirty to fifty plants each of the plant species in each flat. The flats were watered after planting. The following day each flat was sprayed at the rate of 20 pounds of the candidate compound under test in 80 gallons of solution per acre. An atomizer was used to spray the solution on the soil surface. Two weeks later the degree of weed control was determined by comparing the amount of germination and growth of each weed in the treated flats with weeds in several untreated control flats. The herbicidal activity of the compounds is reported in Table II.

TABLE II.—PRE-EMERGENCE ACTIVITY

| Compound No. | Crab grass | Fox-tail | Wild oats | Red oats | Watergrass | Pig-weed | Indian mustard | Annual blue-grass |
|---|---|---|---|---|---|---|---|---|
| 1 | +++ | +++ | +++ |  | +++ | +++ | +++ |  |
| 2 | +++ |  | +++ |  | +++ | +++ | +++ | +++ |
| 3 | +++ |  | +++ |  | +++ | +++ | +++ | +++ |
| 4 | +++ |  | +++ |  | ++ | +++ | ++ | +++ |
| 5 | +++ |  | +++ |  | ++ | +++ |  | +++ |
| 6 | ++ |  |  | +++ | ++ |  | + |  |
| 7 | +++ |  |  |  | ++ | +++ | + |  |
| 8 | +++ |  |  |  | ++ |  | − |  |
| 9 | +++ | +++ |  |  | − |  | + |  |
| 10 | +++ | +++ |  | ++ | +++ |  | − |  |
| 11 | +++ | +++ |  | +++ | ++ | +++ | + |  |
| 12 | +++ | +++ |  |  | ++ | +++ | − |  |
| 13 | +++ | +++ | +++ |  | ++ | + | − | +++ |
| 14 |  | + | + |  |  |  |  | + |
| 15 | +++ | +++ | +++ |  | +++ | ++ | + | +++ |

+++ = Severe injury, death or inhibited germination.
++ = Moderate injury, such as leaf malformation or leaf burn.
+ = Slight injury, such as leaf burn.

Post-emergence herbicide test.—Seeds of crab grass, pinto bean, curled dock, red oats, Indian mustard and watergrass were planted in flats as used in the pre-emergence testing. The plants were allowed to emerge from the soil and develop to 3 to 6 inches in height. Thereafter, the compound under test was applied to the foliage by means of an overhead spray while the flat moves under the spray on a moving belt. A concentration of 0.5% of active compound in the spray was used at a rate of approximately 20 lbs./acre. Two weeks later the injury was rated and recorded as indicated in Table III.

TABLE III.—POST-EMERGENCE ACTIVITY

| Compound No. | Crab grass | Pinto bean | Curled dock | Red oats | Indian mustard | Water grass |
|---|---|---|---|---|---|---|
| 1 | ++ | +++ |  |  | +++ |  |
| 7 | +++ | +++ |  |  | + | +++ |
| 8 | +++ | +++ | + | + | ++ | ++ |
| 9 | +++ | +++ | − | − |  | ++ |
| 10 | +++ | +++ | − | + | +++ | +++ |
| 11 | +++ | +++ | + | + | ++ | + |
| 12 | +++ | +++ | ++ | + | +++ | ++ |
| 13 | ++ | +++ | + | − | + | − |
| 14 | +++ | ++ | +++ | − | ++ | ++ |
| 15 | +++ | ++ | +++ | − | ++ | − |

The compounds of the present invention may be used as pre-emergence or post-emergence herbicides and may be applied in a variety of ways at various concentrations. In practice the compounds are usually formulated with an inert herbicidal adjuvant, utilizing methods well-known to those skilled in the art, thereby making them suitable for application as dusts, sprays, or drenches. The amount applied will depend upon the nature of the seeds or plants to be controlled and the rate of application may vary from 1 to 80 pounds per acre. One particularly advantageous way of applying the herbicidal composition comprising the adjuvant and an effective amount of a compound of the present invention is as a narrow band along a row crop, straddling the row.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. The method of combating weeds comprising applying to the plant habitant a phytotoxic amount of a compound of the formula

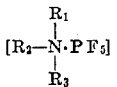

wherein $R_1$, $R_2$ and $R_3$ are selected from the group consisting of hydrogen, lower alkyl, cyclohexyl, phenyl naphthyl and substituted phenyl wherein said substituents are selected from the group consisting of halogen, nitro, lower alkoxy, lower alkyl and combinations thereof.

2. The method of combating weeds comprising applying to the weed habitant a phytotoxic amount of the compound, p - chloroaniline - phosphorous pentafluoride complex.

3. The method of combating weeds comprising applying to the weed habitant a phytotoxic amount of the compound, 2,5 - dichloroaniline - phosphorus pentafluoride complex.

4. The method of combating weeds comprising applying to the weed habitant a phytotoxic amount of the compound, 2,4-dichloroaniline-phosphorus pentafluoride complex.

5. The method of combating weeds comprising applying to the weed habitant a phytotoxic amount of the compound, N-methyl-o-toluidine-phosphorus pentafluoride complex.

6. The method of combating weeds comprising applying to the weed habitant a phytotoxic amount of the compound, 1-aminonaphthalene-phosphorus pentafluoride complex.

References Cited

UNITED STATES PATENTS

| | | | |
|---|---|---|---|
| 3,065,066 | 11/1962 | McRae et al. | 71—2.3 |
| 3,142,554 | 7/1964 | Godfrey | 71—2.3 |
| 3,189,428 | 6/1965 | Mussell | 71—2.3 |
| 3,238,035 | 3/1966 | Fischer et al. | 71—2.3 |
| 2,580,474 | 1/1952 | Sowa | 71—121 |
| 3,300,503 | 1/1967 | Schmutzler | 260—583 |

OTHER REFERENCES

Zhmurova et al.: Mechanism of the Phosphazo Reaction, CA 58, p. 7848 (1963).

Brown et al.: "Dialkylamido Phosphorus Fluorides," (1964) CA 60, p. 10524.

LEWIS GOTTS, *Primary Examiner.*

G. HOLLRAH, *Assistant Examiner.*

U.S. Cl. X.R.

23—50, 357, 368; 71—65, 121; 260—563, 575, 576, 577, 579, 583